(12) United States Patent
Hosoe et al.

(10) Patent No.: US 7,038,579 B2
(45) Date of Patent: May 2, 2006

(54) CATALYST DETECTOR FOR VEHICLE

(75) Inventors: Hiroki Hosoe, Saitama (JP); Tatsuya Okayama, Saitama (JP); Akira Murakami, Saitama (JP); Kengo Takamizawa, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 183 days.

(21) Appl. No.: 10/696,590

(22) Filed: Oct. 30, 2003

(65) Prior Publication Data
US 2004/0168790 A1    Sep. 2, 2004

(30) Foreign Application Priority Data
Oct. 31, 2002    (JP)    ............... 2002-316944

(51) Int. Cl.
*B60Q 1/00*    (2006.01)
(52) U.S. Cl. .............. 340/439; 340/438; 340/449; 436/149; 422/119
(58) Field of Classification Search ............ 340/425.5, 340/438, 439, 449; 436/149, 172, 37; 422/119
See application file for complete search history.

(56) References Cited

U.S. PATENT DOCUMENTS 6,506,605 B1 *    1/2003    Allen et al. .................... 436/37

| | | |
|---|---|---|
| 2001/0019707 A1 | 9/2001 | Okayama et al. |
| 2001/0039928 A1 | 11/2001 | Alleving et al. |
| 2003/0066623 A1 | 4/2003 | McLean et al. |

FOREIGN PATENT DOCUMENTS

| | | |
|---|---|---|
| JP | 2001-079353 | 3/2001 |
| JP | 2001-247017 | 9/2001 |
| JP | 2001-347829 | 12/2001 |

OTHER PUBLICATIONS

International Publication No. WO 01/91890 A1, publication date Dec. 6, 2001.

* cited by examiner

*Primary Examiner*—Julie Bichngoc Lieu
(74) *Attorney, Agent, or Firm*—Arent Fox PLLC

(57) ABSTRACT

A catalyst coating 5 for decomposing ozone in the air is applied to an outer surface of cooling pipes 3 and radiating fins 4 of a radiator 2. A peel sensor 2 is provided on the catalyst coating 5 of the radiator 2 to detect a loss (remaining amount) of the catalyst coating 5. The position of detection of the peel sensor 2 is determined according to a temperature characteristic of the radiator 2, and a flow rate of the air passing through the radiator 2. The position of detection of the peel sensor 2 can be determined easily and appropriately, such that loss and deterioration of the catalyst coating 5 can be detected with high precision.

5 Claims, 8 Drawing Sheets

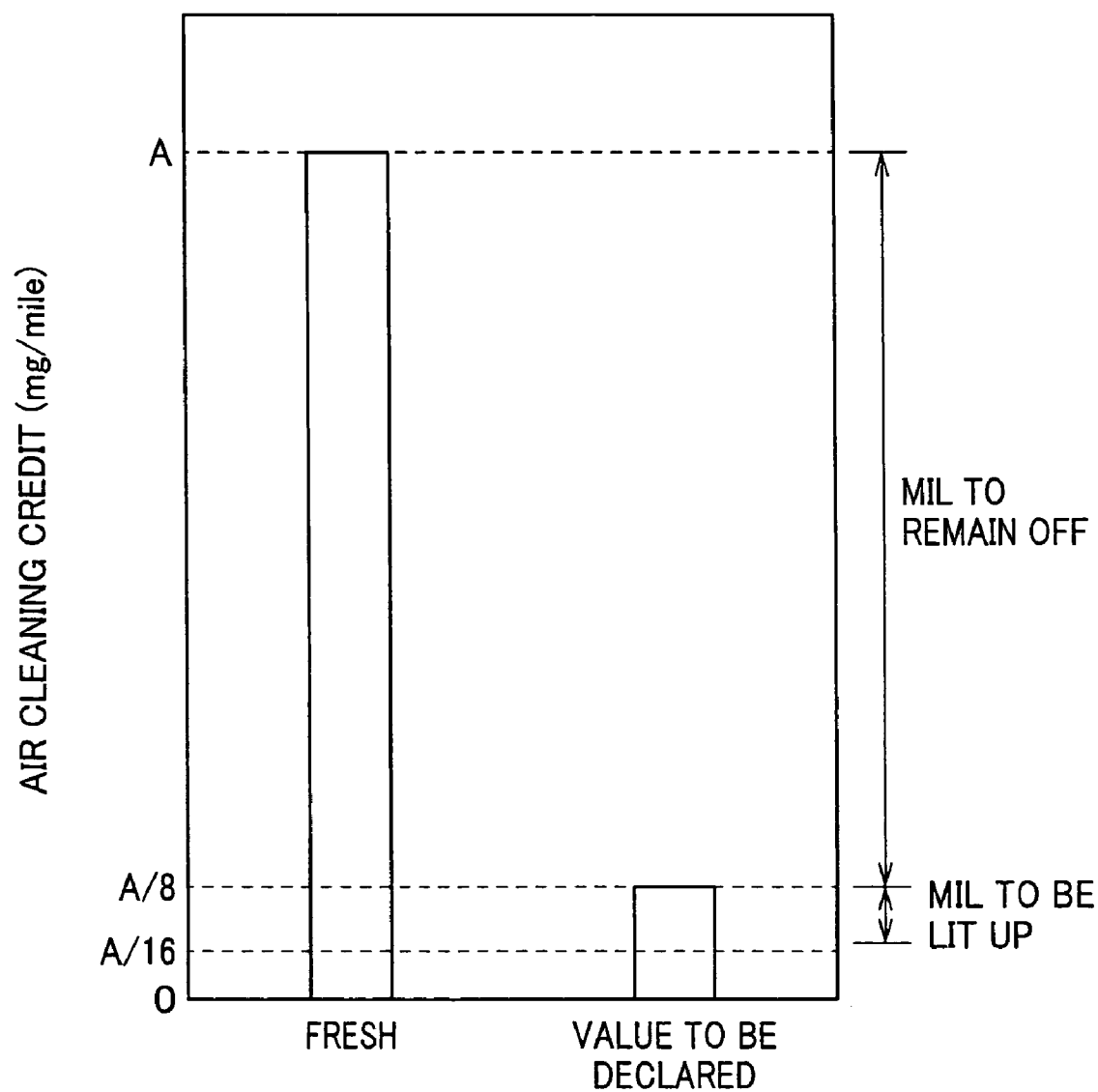

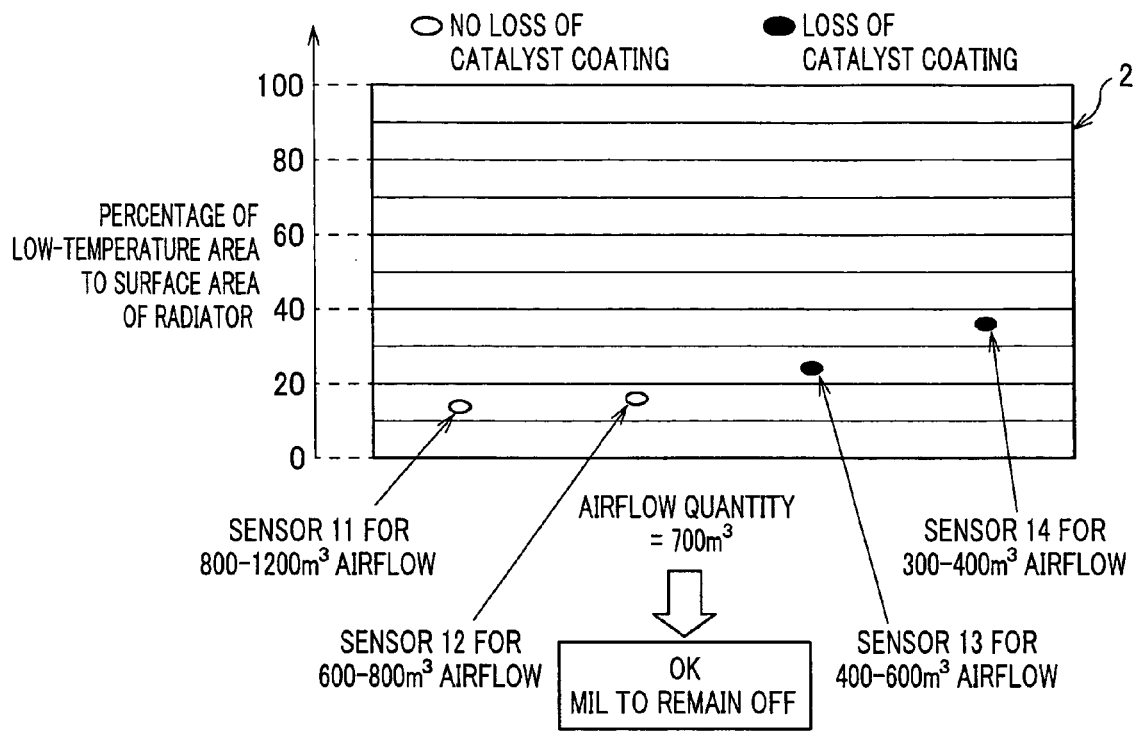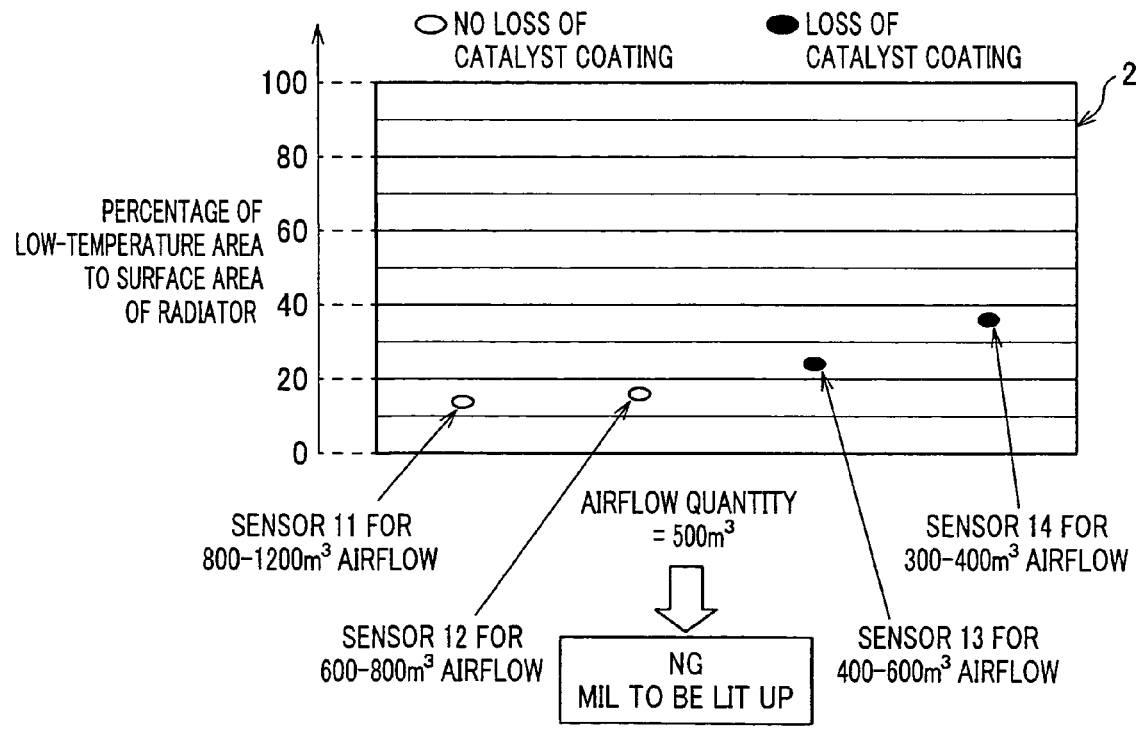

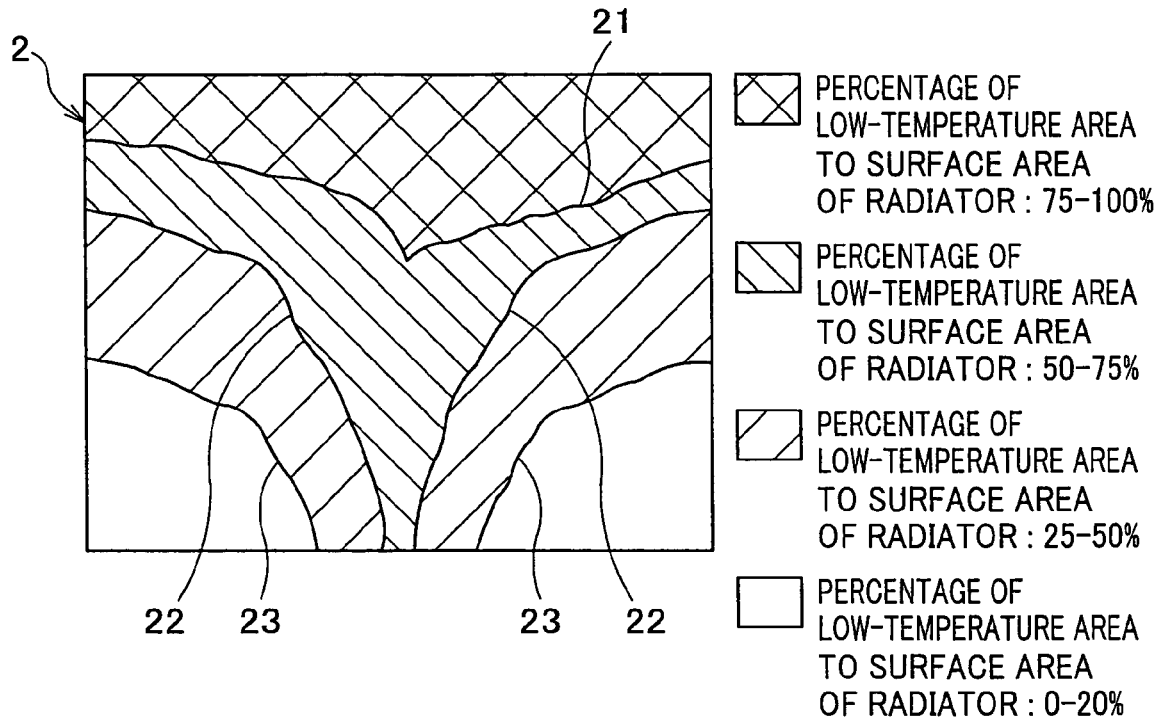
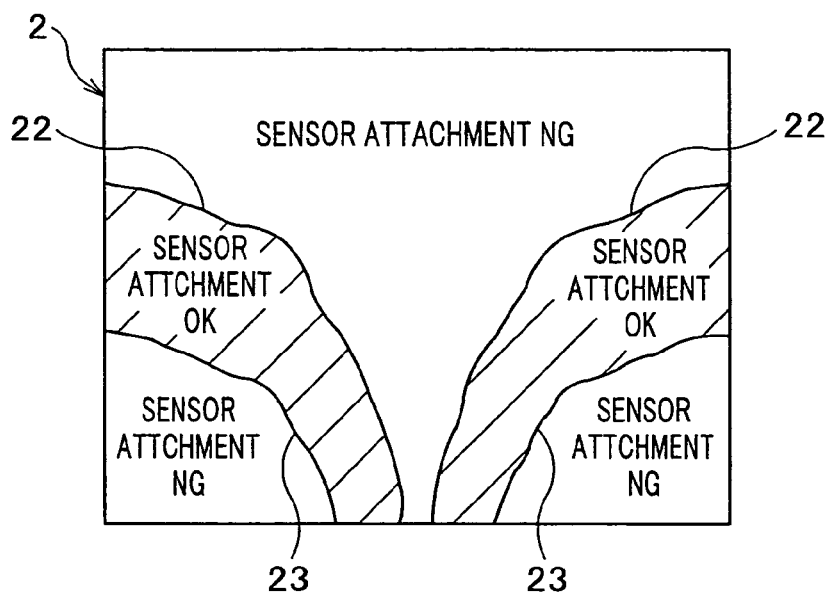

CATALYST DETECTOR FOR VEHICLE

BACKGROUND OF THE INVENTION

This invention relates to a catalyst detector for a vehicle, and more particularly to a detector provided in a vehicle to detect loss and deterioration of a catalyst coating for decomposing chemical substances such as ozone ($O_3$) in the ambient air.

Many national or local governments have a variety of regulations on emissions (exhaust gases) from vehicles. For example, In California, United States, there are regulations on emissions of non-methane organic gases (NMOG), carbon monoxides (CO), nitrogen oxides ($NO_x$), and the like. These regulations make it mandatory for manufacturers of vehicles in California to abide by emission standards (maximum permissible quantities stipulated for each vehicle or control limits set at manufactures' average) for NMOG, etc. Accordingly, each manufacturer has been focusing efforts on the development of low emission vehicles (LEV) or zero emission vehicles (ZEV).

Growing public awareness of environmental problems in recent years has been accelerating the trend toward strict emissions control, and tightening the regulations on emissions. On the other hand, some governments provide interim measures for granting the manufacturers some delay in developing new technologies for reduction in exhaust gases. For example, the NMOG emissions control in California, United States provides an NMOG accreditation program with which NMOG credits are granted to manufacturers adopting the direct ozone reduction (DOR) technology in their products and to DOR-using vehicles. To be more specific, photochemical smog (ozone: $O_3$) in the atmosphere results from chemical reactions involving nitrogen oxides and non-methane organic gases in the presence of sunlight (see FIG. 9), and in California, vehicles having means for catalytically decomposing ozone (and cleaning up the air) during driving utilizing the DOR technology and manufacturers producing such vehicles are accredited with reducing amounts of NMOG emissions, and the state government of California is supposed to grant prescribed incentives (NMOG credits) thereto. Accordingly, the manufactures are making attempts to sell vehicles having an ozone decomposing device that uses the DOR techniques. The ozone decomposing devices that provide an ozone decomposing catalytic coating across a surface of the radiator (surfaces of radiator fins) in the vehicles are disclosed, for example, in JP 2001-247017 A and JP 2001-347829 A.

However, ozone decomposing performances of the ozone decomposing devices are subject to change, and decrease with deterioration of catalyst, loss (detachment) of the catalyst coating and the like. Therefore, NMOG credits are supposed to be granted to the vehicles in accordance with ozone decomposing performances thereof measured after 150,000 miles (approx. 241,350 km) of driving. Each manufacturer evaluates ozone decomposing performances after 150,000 miles of driving for each vehicle type and for each vehicle model through testing of various kinds, and submits an application for certification of NMOG credits with the evaluated value or a value lower than the evaluated value to the authority. The ozone decomposing device installed in a new vehicle should fulfill the evaluated value of the performance at the time of submitting the application, but the performance could disadvantageously decrease to a value lower than the value declared in the application before 15,000 miles of driving depending on circumstances (e.g., under rough usage). To take appropriate measures against the above disadvantage, the manufacturers of the vehicles should continuously demonstrate the ozone decomposing performance and durability of the ozone decomposing device throughout the effective period of service life so that maintenance and checkup can be timely carried out. For that purpose, the manufacturers are required to incorporate an on-board diagnostic (OBD) system for monitoring the performance of the ozone decomposing device in each vehicle they ships, so as to guarantee that appropriate control is being exercised on emissions. Therefore, each manufacturer has been developing such on-board diagnostic systems.

The above disclosures refer to methods of detecting loss or deterioration of catalyst coatings using a sensor or the like (as embodied in on-board diagnostic systems), but no specific reference is made to a position of detection (or a location where a sensor is installed) relative to a radiator. The inventors named in the present application have discovered that the position of detection relative to a radiator is critical in accurate detection of decrease in performance of the ozone decomposing device.

The present invention has been made to address the above-discussed disadvantages, and it is an exemplary general object of the present invention to provide a catalyst detector capable of accurately detecting decrease in performance of the ozone decomposing device provided in vehicles.

SUMMARY OF THE INVENTION

In an assiduous effort in research and development to address the aforementioned disadvantages, the inventors of this application have discovered that loss (peeling or detachment) of a catalyst coating provided on a heat exchanger by heat has a great influence on decrease in performance of the ozone decomposing device, and thus a temperature characteristic of the heat exchanger can be used to predict the decrease of the ozone decomposing performance due to the loss of the catalyst coating. In conclusion, it has turned out that a sensor for detecting the loss (or remaining amount) of the catalyst coating may be attached in an adequate manner based upon the prediction, to evaluate the degree of decrease in ozone decomposing performance.

A detector according to one aspect of the present invention is provided in a vehicle equipped with a heat exchanger, and a catalyst coating provided in the heat exchanger decomposes a chemical substance in air passing through the heat exchanger. The detector includes a sensor and a control unit. The sensor detects a remaining amount of the catalyst coating, and the control unit generates an alarm based upon detection of the sensor. In particular, a position of detection of the sensor is determined according to a temperature characteristic of the heat exchanger.

The catalyst coating gradually comes off from a higher-temperature portion to a lower-temperature portion on a surface of the heat exchanger, and when loss of the catalyst coating eventually takes place in the position of detection of the sensor, the control unit determines that the chemical substance decomposing performance has decreased to an insufficient level, and generates an alarm to give a warning to a passenger of the vehicle. Since the position of detection has been determined according to the temperature characteristic of the heat exchanger, the detector can accurately detect the decrease in performance of the catalyst coating without fail.

In the above configuration, if a flow rate of the air passing through the heat exchanger exceeds a prescribed threshold, it is determined that the performance of the catalyst coating has not decreased below a minimum permissible level yet even when the loss of the catalyst coating takes place in the position of detection of the sensor. On the other hand, if a flow rate of the air passing through the heat exchanger is below the prescribed threshold, it is determined that the performance of the catalyst coating has decreased to an insufficient level when the loss of the catalyst coating takes place in the position of detection of the sensor. Therefore, the position of detection of the sensor may preferably be determined according to a flow rate of the air passing through the heat exchanger in addition to the temperature characteristic of the heat exchanger, so that the detector can more accurately detect the decrease in performance of the catalyst coating. A plurality of positions of detection may be determined respectively, as necessary, for corresponding ranges of flow rates of air passing through the heat exchanger, so that the loss of catalyst coating (i.e., deterioration of the chemical substance decomposing performance) can accurately be detected in an entire range of the possible flow rates of the air passing through the heat exchanger.

The above heat exchanger may be, but not limited to, a radiator, and the temperature characteristic of the heat exchanger used to determine the position of detection of the sensor may be a temperature distribution of a front surface of the radiator or a time integral of temperature distributions of the front surface of the radiator. In this construction, the temperature distribution of the catalyst coating, which serves as an index of susceptibility to coating loss, can be evaluated beforehand from the temperature distribution of the front surface of the radiator. The temperature distribution of the front surface of the radiator can easily be measured using an instrument known in the art, such as a thermography. The use of a time integral of the temperature distributions makes it possible to make the borders of temperature areas more definite.

Moreover, the position of detection of the sensor may be determined so that detection occurs when an amount of decomposition of the chemical substance by an action of the catalyst coating (chemical substance decomposing performance of the catalyst coating) becomes less than a value declared in an application for certification of decomposing performance. When the amount of decomposition of the chemical substance is less than the threshold predetermined based upon the declared value, it is determined that the catalyst coating has deteriorated to an insufficient level.

Other objects and further features of the present invention will become readily apparent from the following description of preferred embodiments with reference to accompanying drawings.

BRIEF DESCRIPTION OF THE DRAWINGS

FIG. 5 is a graph showing characteristics of air cleaning credits obtained by testing with a fresh catalyst coating, and those to be declared in an application for certification of the catalyst coating according to a second embodiment of the present invention.

FIG. 6A is a schematic diagram for explaining detection of loss and deterioration of the catalyst coating using a peel sensor and an airflow sensor when the airflow quantity is 700 $m^3$.

FIG. 6B is a schematic diagram for explaining detection of loss and deterioration of the catalyst coating using a peel sensor and an airflow sensor when the airflow quantity is 500 $m^3$.

FIG. 8A is a distribution map of temperatures on the front surface of the radiator, used in a third embodiment of the present invention.

FIG. 8B is a schematic diagram for explaining determination of the position of attachment of the peel sensor.

DETAILED DESCRIPTION OF THE PREFERRED EMBODIMENTS

A description will be given of exemplified embodiments of a catalyst detector provided in a vehicle (e.g., a passenger car) according to the present invention with reference to the drawings.

First Embodiment

Figure 1:
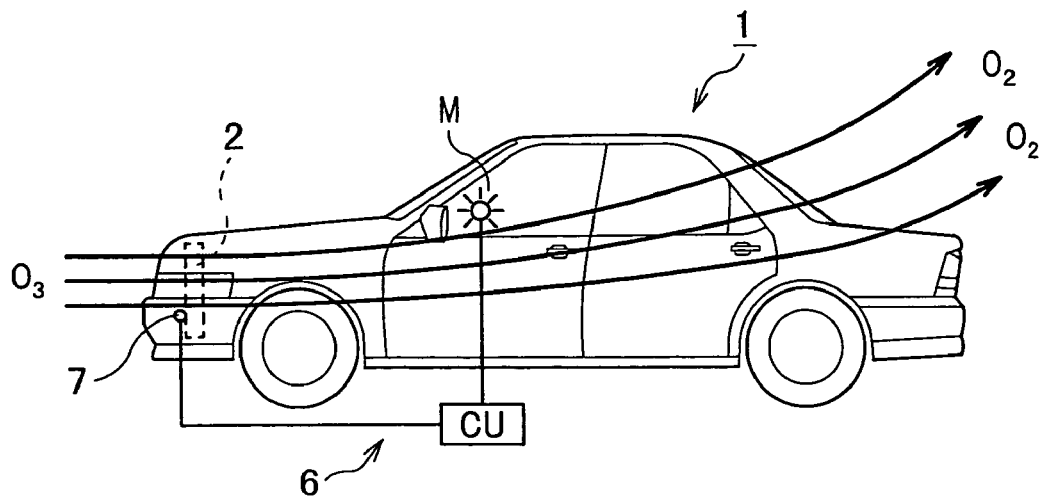
FIG. 1 is an overall view of a vehicle in which one exemplary embodiment of a detector according to the present invention is provided.

As shown in FIG. 1, in a front portion of a vehicle exemplified by a passenger car 1 is provided a heat exchanger exemplified by a radiator 2, which generally includes a plurality of vertically extending cooling pipes 3 through which coolant for an engine of the passenger car 1 flows downwardly, and a large number of radiating fins 4 fixed between cooling pipes 3. The radiator 2 dissipates heat in the coolant, which is heated in the engine of the passenger car 1 during driving, into air, so that the coolant is maintained constantly at an adequate range of temperature.

To outer surfaces of the cooling pipes 3 and the radiating fins 4 constituting the radiator 2 is entirely applied, using a bonding agent such as an organic binder (not shown), an ozone reducing catalyst coating 5 (hereinafter referred to as catalyst coating 5). The catalyst coating 5 serves to decompose ozone ($O_3$) as a chemical substance in the air passing within the radiator 2 between the radiating fins 4 thereof into oxygen ($O_2$), and to reduce ozone in the air thereby cleaning the air (see FIG. 1).

The detector 6 includes a peel sensor 7 embedded in the catalyst coating 5 and fixed on the radiator 2, a control unit CU for generating an alarm signal based upon a detection value from the peel sensor 7, and a MIL illumination (hereinafter referred to as MIL M) that is turned on and off based upon the alarm signal from the control unit CU.

Figure 2:
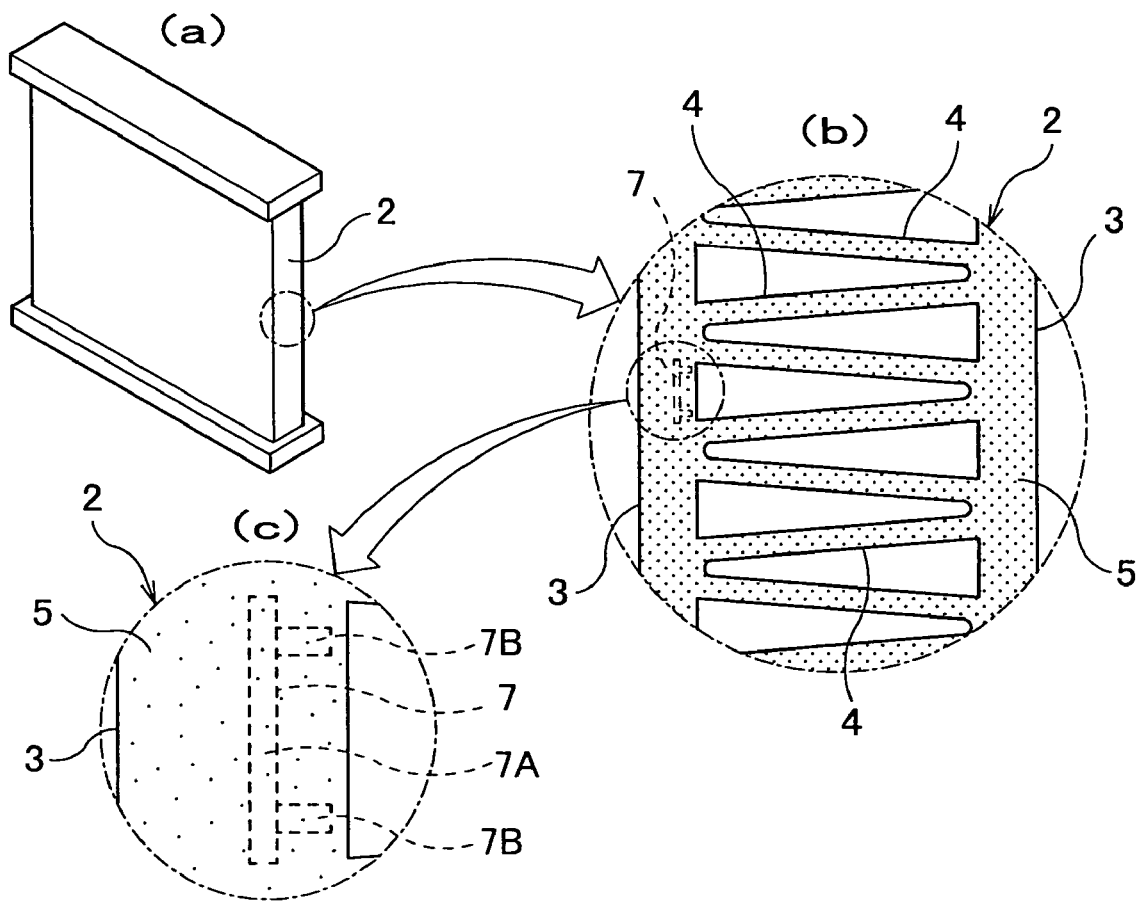
FIG. 2 is an enlarged view of a radiator and peel sensor shown in FIG. 1, in which (a) shows a perspective view of the radiator, (b) shows a partial enlarged view of the radiator, and (c) shows an enlarged view of the peel sensor illustrated in (b).

The peel sensor 7, as shown in FIG. 2(*b*) and (*c*), includes a base 7A made of insulating material and fixed on the outer surface of the cooling pipe 3 in the radiator 2, and a pair of lead wires 7A, 7B each stuck on the base 7A separately, one on an upper portion thereof, the other on a lower portion thereof.

As will be described later in detail, the catalyst coating 5 gradually comes off and deteriorates with increase in distance of driving or the like, from the upper portion which is high in temperature, toward the lower portion. When a position where the catalyst coating 5 has come off reaches between the lead wires 7A and 7B, the resistance between the lead wires 7A and 7B changes. The peel sensor 7 then outputs a quantity of change in resistance to a controller (not shown), and thereby detects a remaining amount of the catalyst coating 5. The position of detection (attachment) of the peel sensor 7 on the radiator 2 is determined so that detection occurs if an amount of ozone decomposition by an action of the catalyst coating 5 becomes less than a value declared in an application for certification of credits, as will be described later.

The provisions in the United States (e.g., in California) make it obligatory to detect such loss or deterioration of the catalyst coating 5 as described above. Therefore, the detector 6 need be provided to accurately detect the loss and deterioration of the catalyst coating 5.

Next a description will be given of an example of determination of a position of attachment of the peel sensor 7 on the radiator 2 with reference to FIGS. 3 and 4.

Figure 3:
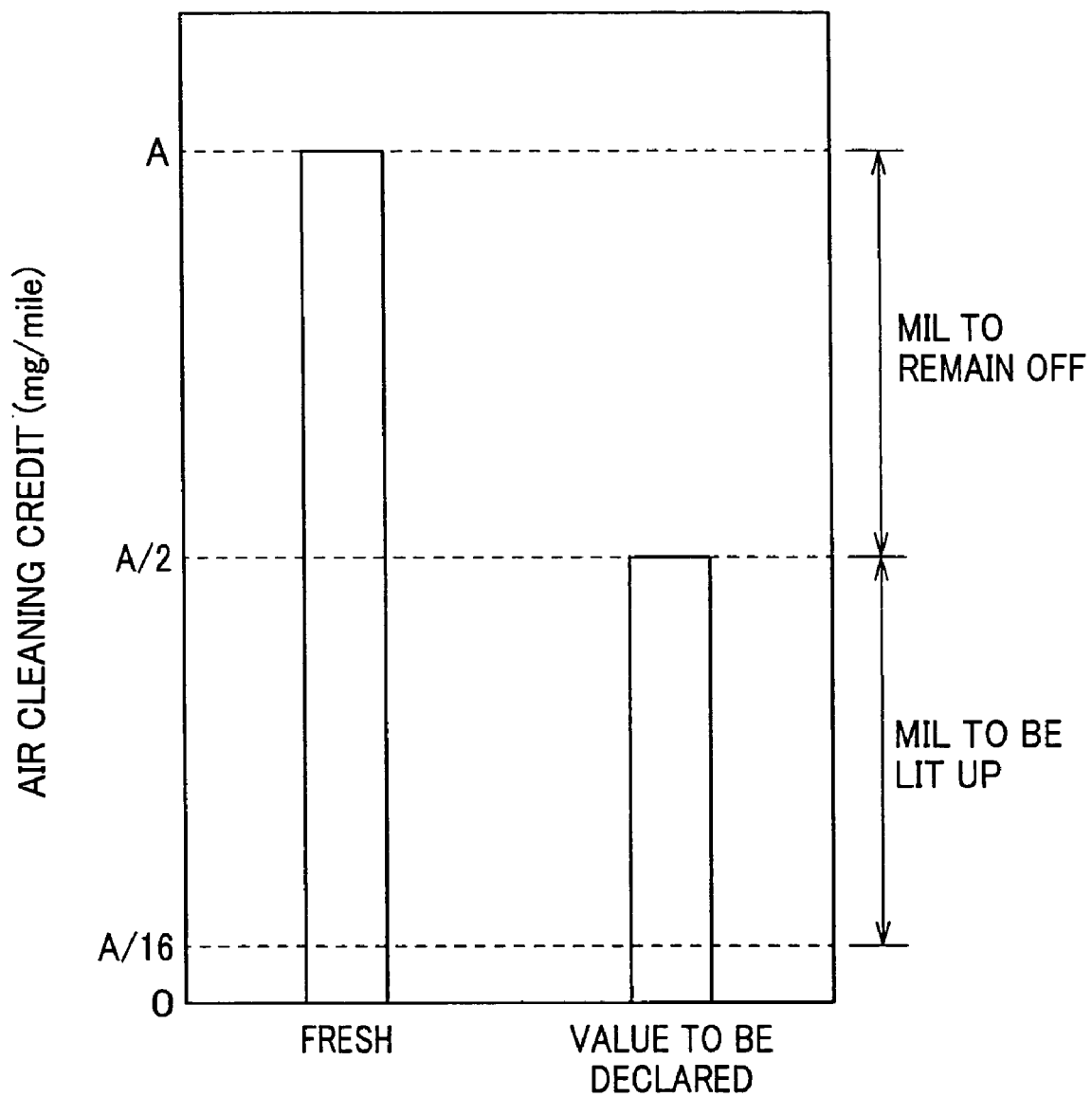
FIG. 3 is a graph showing characteristics of air cleaning credits obtained by testing with a fresh catalyst coating, and those to be declared in an application for certification of the catalyst coating according to a first embodiment of the present invention.

In FIG. 3, the y-axis denotes an air cleaning credit as an index of ozone decomposing performance of the catalyst coating 5. The air cleaning credit is obtained by Equation (1) as follows:

$$\text{AirCleaningCredit} = K \times AF \times \eta \quad (1)$$

where K is a constant, AF is a flow rate (flow quantity per unit time) of air passing through the radiator 2, and $\eta$ is an ozone reduction rate (percentage indicating ozone reducing efficiency).

Assuming that a specific driving test is carried out with a fresh catalyst coating 5, the flow quantity AF of air passing through the radiator 2 (hereinafter referred to as airflow quantity AF) becomes $AF_{Fresh}=1200\ m^3$, and the ozone reduction rate $\eta$ of the catalyst coating 5 exhibits $\eta_{Fresh}=80\%$. It is understood that the airflow quantity AF is designated by a volume (cubic meter) of air passing per unit time in a prescribed mode.

In this instance, the air cleaning credit A represented upon testing with a fresh catalyst coating 5 can be obtained from Equation (1) and FIG. 3 as expressed in Equation (2) as follows:

$$A(\text{mg/mile}) = K \times 1200 (m^3) \times 80 (\%) \quad (2)$$

where $AF_{Fresh}=1200\ m^3$, and $\eta_{Fresh}=80\%$.

Assuming that another driving test is carried out with a catalyst coating 5 after 150,000 miles of normal and steady driving, the air cleaning credit lowers to A/2 (mg/mile), which is used as a value to be declared in an application for certification of NMOG credits for quality assurance of the catalyst coating 5 (see FIG. 3).

Accordingly, if the air cleaning credit for the catalyst coating 5 falls within a range between A and A/2, then it is determined that the catalyst coating 5 has not deteriorated but still has sufficient level of performance maintained, and the MIL M in the detector 6 remains turned off as shown in FIG. 3.

Figure 4A:
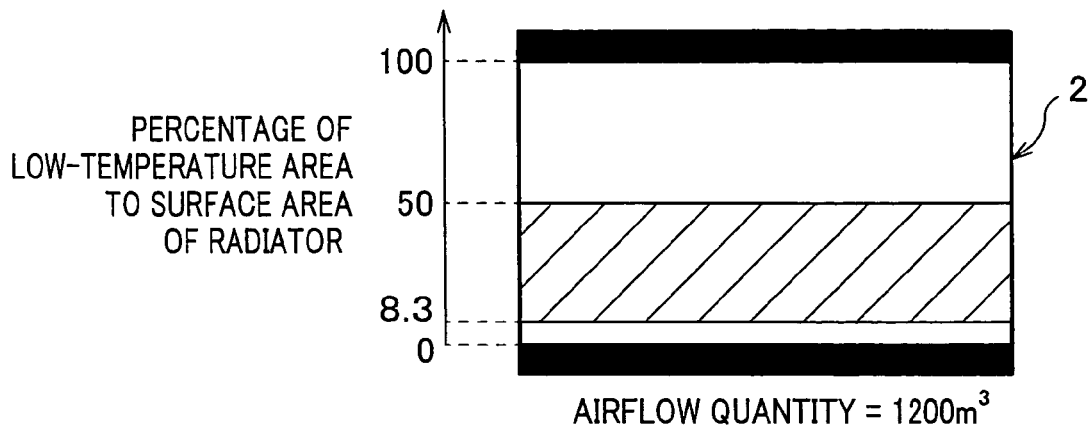
FIG. 4A is a distribution map illustrating two upper-limit borders of low-temperature areas (in percentage) of a front surface of the radiator, corresponding to the maximum and minimum catalyst retention rates respectively, with the airflow quantity being 1200 $m^3$.
Figure 4B:
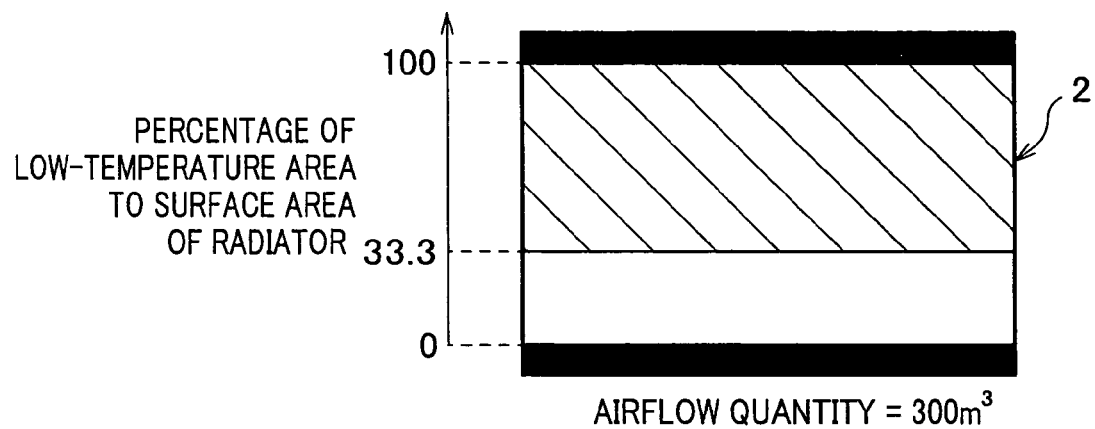
FIG. 4B is a distribution map illustrating an upper-limit border of a low-temperature area (in percentage) of the front surface of the radiator, corresponding to the minimum catalyst retention rate, with the airflow quantity being 300 $m^3$.

The air cleaning credit represented immediately before an engine becomes nearly overheated for some reason, e.g., because a malfunction occurs in the radiator 2, lowers to A/16 (mg/mile) as shown in FIG. 3, and the airflow quantity AF at that time decreases to $AF_{min}=300\ m^3$ as shown in FIG. 4B.

Accordingly, when the air cleaning credit for the catalyst coating 5 exhibits a value equal to or higher than A/16 and lower than A/2, it is determined that the ozone reducing performance of the catalyst coating 5 has lowered to an insufficient level, and then the MIL M of the detector 6 is lit up (see FIG. 3) to give a warning to a passenger.

Next, a description will be given of a position of attachment (position of detection) of the peel sensor 7 to be determined appropriately when the air cleaning credit for the catalyst coating 5 falls within a MIL M illumination range (equal to or higher than A/16 and lower than A/2).

Assuming that the air cleaning credit A becomes the value A/2 (mg/mile) declared in the application for certification, and the airflow quantity AF becomes a maximum value $AF_{max}=1200\ m^3$, the following Equation (3) can be derived from Equation (1):

$$A/2(\text{mg/mile}) = K \times 1200(m^3) \times \eta_{max}(\%) \quad (3)$$

where the maximum airflow quantity $AF_{max}=1200\ m^3$, and $\eta_{max}$ represents a maximum ozone reduction rate (%).

On the other hand, assuming that the air cleaning credit A decreases to the value A/16 (mg/mile) exhibited when the radiator 2 is overheated, and the airflow quantity AF becomes the maximum value $AF_{max}=1200\ m^3$, the following Equation (4) can be formulated from Equation (1):

$$A/16(\text{mg/mile}) = K \times 1200(m^3) \times \eta_{min}(\%) \quad (4)$$

where the maximum airflow quantity $AF_{max}=1200\ m^3$, and $\eta_{min}$ represents a minimum ozone reduction rate (%).

Thus, the ozone reduction rate $\eta$ (%) represented when the airflow quantity AF exhibits the maximum value 1200 $m^3$ can be obtained from the above Equations (2)–(4) as follows:

$\eta_{max}=40\%$ [air cleaning credit: A/2(mg/mile)]
$\eta_{min}=5\%$ [air cleaning credit: A/16(mg/mile)]

In this instance, $\eta_{Fresh}=80\%$, as shown in Equation (2), and a catalyst retention rate (percentage of the catalyst coating 5 remaining on the radiator 2) for a fresh catalyst coating 5 is 100%; therefore, the catalyst retention rate turns out to be 50% when $\eta_{max}=40\%$.

In contrast, the catalyst retention rate becomes 6.25% (100%×1/16) when $\eta_{min}=5\%$ However, the ozone reduction rate lowers to three fourths (3/4) due to deterioration of the catalyst coating 5 itself, and thus it should be determined by the time when the catalyst retention rate becomes 8.3% (6.25%×4/3) that the catalyst coating 5 has come off or deteriorated to a critically low level.

Since the catalyst coating 5 gradually comes off from an upper portion of the radiator 2 having a relatively high temperature toward a lower portion thereof having a relatively low temperature, it is understood that the catalyst retention rate of the radiator 2 is equivalent to the percentage of a low-temperature area to a surface area (e.g., of the front surface) of the radiator 2.

From the foregoing, temperature characteristic (temperature distribution) of the front surface of the radiator 2 measured in advance during operation of the passenger car 1 is used to determine the position of attachment of the peel sensor 7. For example, if the temperature distribution of the front surface of the radiator 2 represented when the airflow quantity AF exhibits a maximum value $AF_{max}=1200$ m$^3$ is as shown in FIG. 4A, then the peel sensor 7 may be attached to a position within an area between two upper-limit borders of the low-temperature areas of which the percentages to the front surface area of the radiator 2 are 8.3% and 50% respectively, so that loss and deterioration of the catalyst coating 5 can be detected accurately.

On the other hand, assuming that the airflow quantity AF exhibits a minimum value $AF_{min}=300$ m$^3$ as shown in FIG. 4B, the following Equations (5) and (6) can be derived from Equation (1):

$$A/2 (\text{mg/mile}) = K \times 300 (m^3) \times \eta_{max} (\%) \quad (5)$$

$$A/16 (\text{mg/mile}) = K \times 300 (m^3) \times \eta_{min} (\%) \quad (6)$$

Thus, the ozone reduction rates η (%) represented when the airflow quantity AF exhibits the minimum value $AF_{min}=300$ m$^3$ can be obtained from the above Equations (2), (5) and (6) as follows:

$\eta_{max}=160\%$ [air cleaning credit: A/2(mg/mile)]

$\eta_{min}=20\%$ [air cleaning credit: A/16(mg/mile)]

In this instance, as described above, $\eta_{Fresh}=80\%$ and the catalyst retention rate for a fresh catalyst coating 5 is 100%; therefore, the catalyst retention rate turns out to be 25% (¼) when $\eta_{min}=20\%$.

However, the ozone reduction rate lowers to three fourths (¾) due to deterioration of the catalyst coating 5 itself, and it should thus be determined by the time when the catalyst retention rate becomes 33.3% (25%×4/3) or higher that the catalyst coating 5 has come off or deteriorated to a critically low level. Since $\eta_{max}$ is more than 100%, calculation of the upper limit of the catalyst retention rate is omitted.

Accordingly, if the temperature distribution of the front surface of the radiator 2 represented when the airflow quantity AF exhibits the minimum value $AF_{min}=300$ m$^3$ is as shown in FIG. 4B, then the peel sensor 7 may be attached to a position within an area between two upper-limit borders of the low-temperature areas of which the percentages to the front surface area of the radiator 2 are 33.3% and 100% respectively, so that loss and deterioration of the catalyst coating 5 can be detected accurately.

Figure 4C:
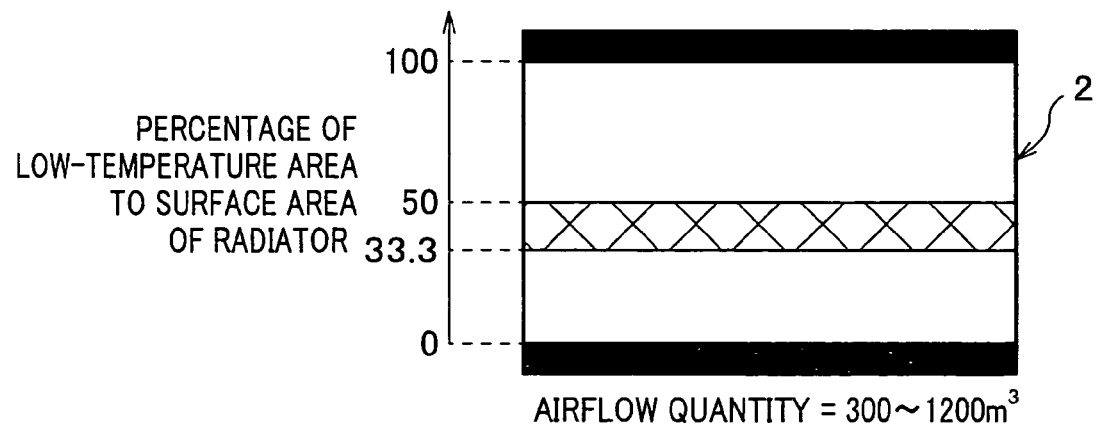
FIG. 4C is a distribution map illustrating two upper-limit borders of low-temperature areas (in percentage) of the front surface of the radiator, corresponding to the maximum and minimum catalyst retention rates respectively, with the airflow quantity ranging from 300–1200 $m^3$.

From the foregoing, just attaching one peel sensor 7 to a position within an area between two upper-limit borders of the low-temperature areas covering 33.3% and 50% of the front surface area of the radiator 2 respectively, as shown in FIG. 4C, makes it possible to accurately detect the loss and deterioration of the catalyst coating 5 in an entire range of the possible flow quantities (300–1200 m$^3$) of air passing through the radiator 2, in the present embodiment, allowing the control unit CU to turn on the MIL M of the detector 6 to notify the passenger of the deterioration of the catalyst coating 5. Moreover, the present embodiment can obviate the need for installing any other sensors such as an airflow sensor or the like, and thus can reduce the total cost for installing the detector 6 in the vehicle.

Second Embodiment

A description will be given of a second embodiment of the present invention with reference to FIGS. 5, 6A, 6B, 7A and 7B. This embodiment utilizes a plurality of peel sensors that make it possible to detect loss and deterioration of a catalyst coating even if the maximum ozone reduction rate represented when the airflow quantity exhibits a maximum value is smaller than the minimum ozone reduction rate represented when the airflow quantity exhibits a minimum value.

For convenience of explanation of the present embodiment, components deemed identical with those in the first embodiment are designated by the same reference characters, and a duplicate description thereof will be omitted.

In FIG. 5, the y-axis denotes an air cleaning credit as in FIG. 3. Assuming that a specific driving test is carried out with a fresh catalyst coating (not shown), the airflow quantity AF becomes $AF_{Fresh}=1200$ m$^3$, and the ozone reduction rate η of the catalyst coating exhibits $\eta_{Fresh}=80\%$, as in the first embodiment.

In this instance, the air cleaning credit A represented upon testing with a fresh catalyst coating can be obtained from Equation (1) and FIG. 5 as expressed in Equation (2) as above.

Assuming that another driving test is carried out with a catalyst coating after 150,000 miles of normal and steady driving, the air cleaning credit lowers to A/8 (mg/mile), which is used as a value to be declared in an application for certification of NMOG credits for quality assurance of the catalyst coating 5 (see FIG. 5).

Accordingly, if the air cleaning credit for the catalyst coating falls within a range between A and A/8, then it is determined that the catalyst coating has not deteriorated but still has sufficient level of performance maintained, and the MIL M remains turned off as shown in FIG. 5.

The air cleaning credit represented immediately before a malfunction occurs in the radiator 2 lowers to A/16 (mg/mile) as shown in FIG. 5, and the airflow quantity AF at that time decreases to $AF_{min}=300$ m$^3$.

Accordingly, when the air cleaning credit for the catalyst coating exhibits a value equal to or higher than A/16 and lower than A/8, it is determined that the ozone reducing performance of the catalyst coating has lowered to an insufficient level, and then the MIL M is lit up (see FIG. 5) to give a warning to a passenger.

Next, a description will be given of a position of attachment of the peel sensor to be determined appropriately when the air cleaning credit for the catalyst coating falls within a MIL M illumination range (equal to or higher than A/16 and lower than A/8).

Assuming that the air cleaning credit A becomes the value A/8 (mg/mile) declared in the application for certification, and the airflow quantity AF becomes a maximum value $AF_{max}=1200$ m$^3$, the following Equation (7) can be derived from Equation (1):

$$A/8 (\text{mg/mile}) = K \times 1200 (m^3) \times \eta_{max} (\%) \quad (7)$$

where the maximum airflow quantity $AF_{max}=1200$ m$^3$, and $\eta_{max}$ represents a maximum ozone reduction rate (%).

On the other hand, assuming that the air cleaning credit decreases to the value A/16 (mg/mile) exhibited when the radiator 2 is overheated, and the airflow quantity AF becomes the maximum value $AF_{max}=1200$ m$^3$, the following Equation (8) can be formulated from Equation (1):

$$A/16(\text{mg/mile})=K \times 1200(m^3) \times \eta_{min}(\%) \quad (8)$$

where the maximum airflow quantity $AF_{max}=1200$ m$^3$, and $\eta_{min}$ represents a minimum ozone reduction rate (%).

Thus, the ozone reduction rate η (%) represented when the airflow quantity AF exhibits the maximum value 1200 m$^3$ can be obtained from the above Equations (2), (7) and (8) as follows:

$\eta_{max}$=10% [air cleaning credit: A/8(mg/mile)]
$\eta_{min}$=5% [air cleaning credit: A/16(mg/mile)]

On the other hand, assuming that the airflow quantity AF exhibits a minimum value $AF_{min}=300$ m$^3$, the following Equations (9) and (10) can be derived from Equation (1):

$$A/8(\text{mg/mile})=K \times 300(m^3) \times \eta_{max}(\%) \quad (9)$$

$$A/16(\text{mg/mile})=K \times 300(m^3) \times \eta_{min}(\%) \quad (10)$$

Thus, the ozone reduction rate η (%) represented when the airflow quantity AF exhibits the minimum value $AF_{min}=300$ m$^3$ can be obtained from the above Equations (2), (9) and (10) as follows:

$\eta_{max}$=10% [air cleaning credit: A/8(mg/mile)]
$\eta_{min}$=5% [air cleaning credit: A/16(mg/mile)]

If $\eta_{max}$=10% and $\eta_{min}$=5% are satisfied as above, then it is determined from calculation of catalyst retention rate as in the first embodiment that a peel sensor may be attached to a position within an area between two upper-limit borders of the low-temperature areas of which the percentages to the front surface area of the radiator 2 are 8.3% and 12.5% respectively, so that loss and deterioration of the catalyst coating can be detected accurately. In contrast, if $\eta_{max}$=40% and $\eta_{min}$=20% are satisfied, it is determined that a peel sensor may be attached to a position within an area between two upper-limit borders of the low-temperature areas of which the percentages to the front surface area of the radiator 2 are 33.3% and 50% respectively, so that loss and deterioration of the catalyst coating can be detected accurately.

However, unlike the first embodiment, there is no common range of the areas (as defined by two upper-limit borders of the low-temperature areas) between the area determined when $\eta_{max}$=10% and $\eta_{min}$=5% are satisfied (i.e., the percentage of the low-temperature area to the front surface area of the radiator 2 falls between 8.3% and 12.5%) and the area determined when $\eta_{max}$=40% and $\eta_{min}$=20% are satisfied (i.e., the percentage of the low-temperature area to the front surface area of the radiator 2 falls between 33.3% and 50%). Therefore, the loss of catalyst coating in an entire range of the possible flow quantities (300–1200 m$^3$) cannot be detected with a single peel sensor.

Accordingly, a method of detecting the loss of catalyst coating in the entire range of the possible flow quantities using a plurality of peel sensors according to the present embodiment will now be described with reference to FIGS. 6A and 6B.

It is assumed that the ozone reduction rates, catalyst retention rates (percentages of the catalyst coating remaining on the radiator) and areas defined by two upper-limit borders of the low-temperature areas are calculated in the same manner as in the first embodiment.

First, when the airflow quantity AF of the radiator 2 is $AF_{Fresh}=1200$ m$^3$, the ozone reduction rate η (%) takes the maximum and minimum values as follow:

$\eta_{max}$=10% [air cleaning credit: A/8(mg/mile)]
$\eta_{min}$=5% [air cleaning credit: A/16(mg/mile)]

Accordingly, the MIL M needs to be lit up when the catalyst retention rate, i.e., percentage of a low-temperature area to the front surface area of the radiator 2, satisfies Equation (11) as follows:

$$8.3\% \leq LTA(\%) \leq 12.5\% \quad (11)$$

where LTA denotes the percentage of a low-temperature area to the front surface area of the radiator 2.

Second, when the airflow quantity AF of the radiator 2 is AF=800 m$^3$, the ozone reduction rate η (%) takes the maximum and minimum values as follow:

$\eta_{max}$=15% [air cleaning credit: A/8(mg/mile)]
$\eta_{min}$=7.5% [air cleaning credit: A/16(mg/mile)]

Accordingly, the MIL M needs to be lit up when LTA (percentage of a low-temperature area to the front surface area of the radiator 2) satisfies Equation (12) as follows:

$$12.5\% \leq LTA(\%) \leq 18.7\% \quad (12)$$

Next, when the airflow quantity AF of the radiator 2 is AF=600 m$^3$, the ozone reduction rate η (%) takes the maximum and minimum values as follow:

$\eta_{max}$=20% [air cleaning credit: A/8(mg/mile)]
$\eta_{min}$=10% [air cleaning credit: A/16(mg/mile)]

Accordingly, the MIL M needs to be lit up when LTA (percentage of a low-temperature area to the front surface area of the radiator 2) satisfies Equation (13) as follows:

$$16.7\% \leq LTA(\%) \leq 25\% \quad (13)$$

Next, when the airflow quantity AF of the radiator 2 is AF=400 m$^3$, the ozone reduction rate η (%) takes the maximum and minimum values as follow:

$\eta_{max}$=30% [air cleaning credit: A/8(mg/mile)]
$\eta_{min}$=15% [air cleaning credit: A/16(mg/mile)]

Accordingly, the MIL M needs to be lit up when LTA (percentage of a low-temperature area to the front surface area of the radiator 2) satisfies Equation (14) as follows:

$$25\% \leq LTA(\%) \leq 37.5\% \quad (14)$$

Lastly, when the airflow quantity AF of the radiator 2 is $AF_{min}=300$ m$^3$, the ozone reduction rate η (%) takes the maximum and minimum values as follow:

$\eta_{max}$=40% [air cleaning credit: A/8(mg/mile)]
$\eta_{min}$=20% [air cleaning credit: A/16(mg/mile)]

Accordingly, the MIL M needs to be lit up when LTA (percentage of a low-temperature area to the front surface area of the radiator 2) satisfies Equation (15) as follows:

$$33.3\% < LTA(\%) \leq 50\% \quad (15)$$

As a result, a peel sensor 11 may be attached to a position on the radiator 2 along an upper-limit border of a low-temperature area of which the percentage to the front surface area of the radiator 2 is 12.5%, which is derived from Equations (11) and (12), so that loss and deterioration of the catalyst coating can be detected accurately when the airflow quantity AF satisfies 800 m$^3 \leq$ AF $\leq$ 1200 m$^3$.

Moreover, a peel sensor 12 may be attached to a position on the radiator 2 between upper-limit borders of low-temperature areas of which the percentages to the front surface area of the radiator 2 are 16.7% and 18.7%, which are derived from Equations (12) and (13), so that loss and deterioration of the catalyst coating can be detected accurately when the airflow quantity AF satisfies 600 m$^3 \leq$ AF $\leq$ 800 m$^3$.

Further, a peel sensor 13 may be attached to a position on the radiator 2 along an upper-limit border of a low-temperature area of which the percentage to the front surface area of the radiator 2 is 25%, which is derived from Equations (13)

and (14), so that loss and deterioration of the catalyst coating can be detected accurately when the airflow quantity AF satisfies 400 m³≦AF≦600 m³.

Furthermore, a peel sensor 14 may be attached to a position on the radiator 2 between upper-limit borders of low-temperature areas of which the percentages to the front surface area of the radiator 2 are 33.3% and 37.5%, which are derived from Equations (14) and (15), so that loss and deterioration of the catalyst coating can be detected accurately when the airflow quantity AF satisfies 300 m³≦AF≦400 m³.

In conclusion, the use of these four peel sensors 11–14 makes it possible to accurately detect the loss of the catalyst coating in the entire range of the possible airflow quantities (i.e., 300–1200 m³).

Specific examples of the methods for detecting loss and deterioration of the catalyst coating using the peel sensors 11–14 and an airflow sensor (not shown) will now be given with reference to FIGS. 6A and 6B. The airflow sensor may be attached to position on the lee side of the radiator 2 shown in FIG. 1.

In these examples, as shown in FIGS. 6A and 6B, the catalyst coating remains at positions where the sensors 11, 12 are located, but has come off at positions where the sensors 13, 14 are located. The airflow quantity is set at 700 m³ in the example of FIG. 6A, and at 500 m³ in the example of FIG. 6B.

In these examples, the airflow sensor is activated first, and then one of the peel sensors 11–14 corresponding to an airflow quantity detected by the airflow sensor is activated.

Referring to FIG. 6A, an airflow quantity is detected by the airflow sensor in advance, and one peel sensor for detecting loss of the catalyst coating is selected among the sensors 11–14 in accordance with the detected airflow quantity. In this example, the airflow quantity is 700 m³, and thus the peel sensor 12 for 600–800 m³ of airflow is activated. Since this peel sensor 12 detects the presence of the catalyst coating (and it is thus determined that the catalysis coating remains), the MIL M is kept turned off.

Referring to FIG. 6B, as well, an airflow quantity is detected by the airflow sensor in advance, and one peel sensor for detecting loss of the catalyst coating is selected among the sensors 11–14 in accordance with the detected airflow quantity. In contrast to the example of FIG. 6A, the airflow quantity is 500 m³, and thus the peel sensor 13 for 400–600 m³ of airflow is activated. Since this peel sensor 13 detects the loss of the catalyst coating (and it is thus determined that the catalysis coating has come off), the MIL M is lit up to notify the passenger of the loss and deterioration of the catalyst coating.

Other specific examples of the methods for detecting loss and deterioration of the catalyst coating using the peel sensors 11–14 and the airflow sensor will next be given with reference to FIGS. 7A and 7B.

Figure 7A:
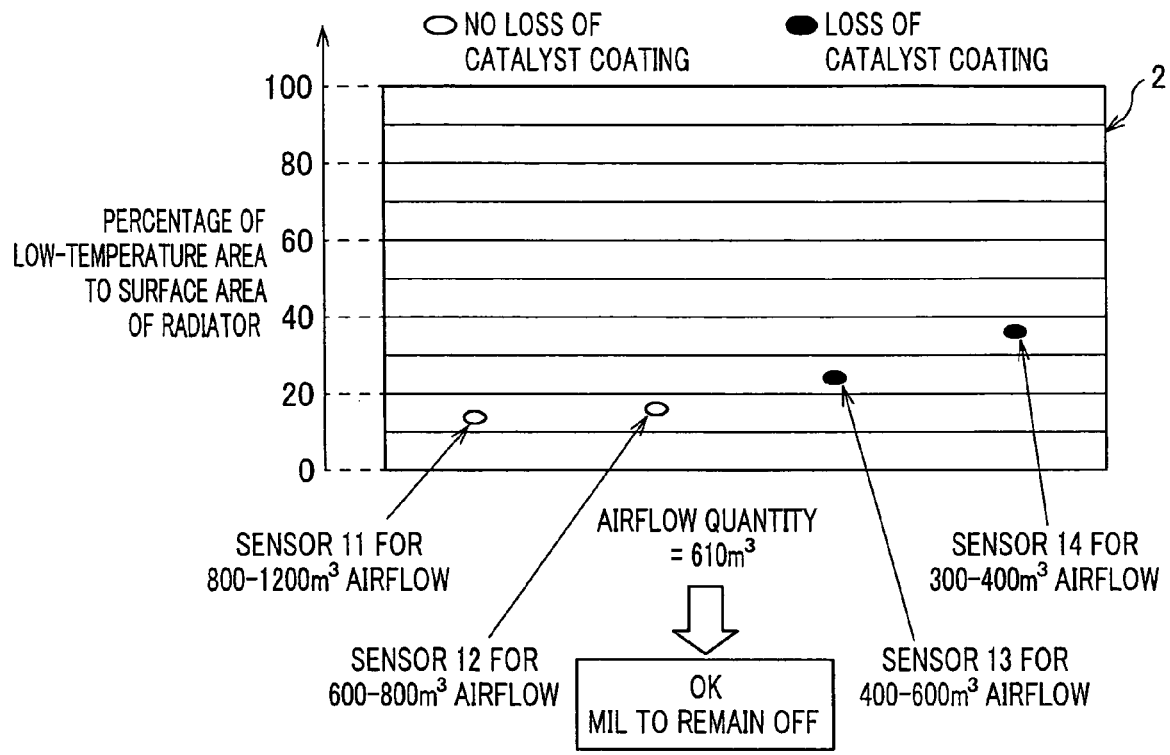
FIG. 7A is a schematic diagram for explaining detection of loss and deterioration of the catalyst coating using a peel sensor and an airflow sensor when the airflow quantity is 610 $m^3$.
Figure 7B:
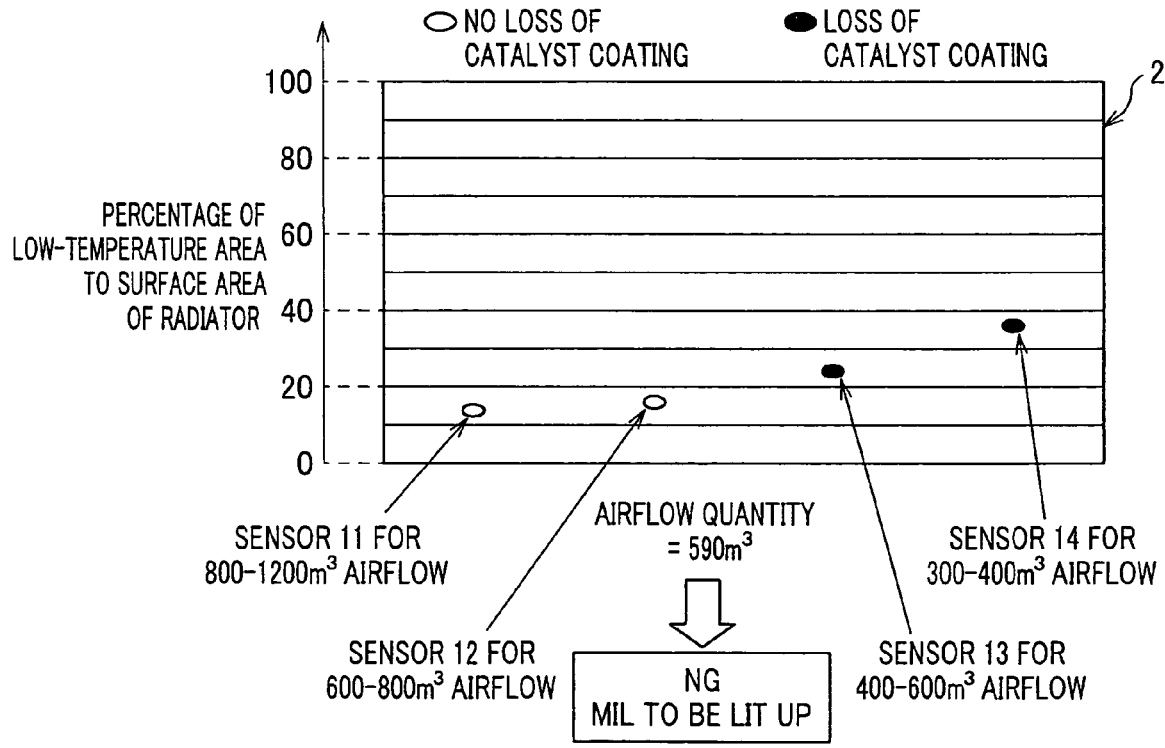
FIG. 7B is a schematic diagram for explaining detection of loss and deterioration of the catalyst coating using a peel sensor and an airflow sensor when the airflow quantity is 590 $m^3$.
Figure 9:
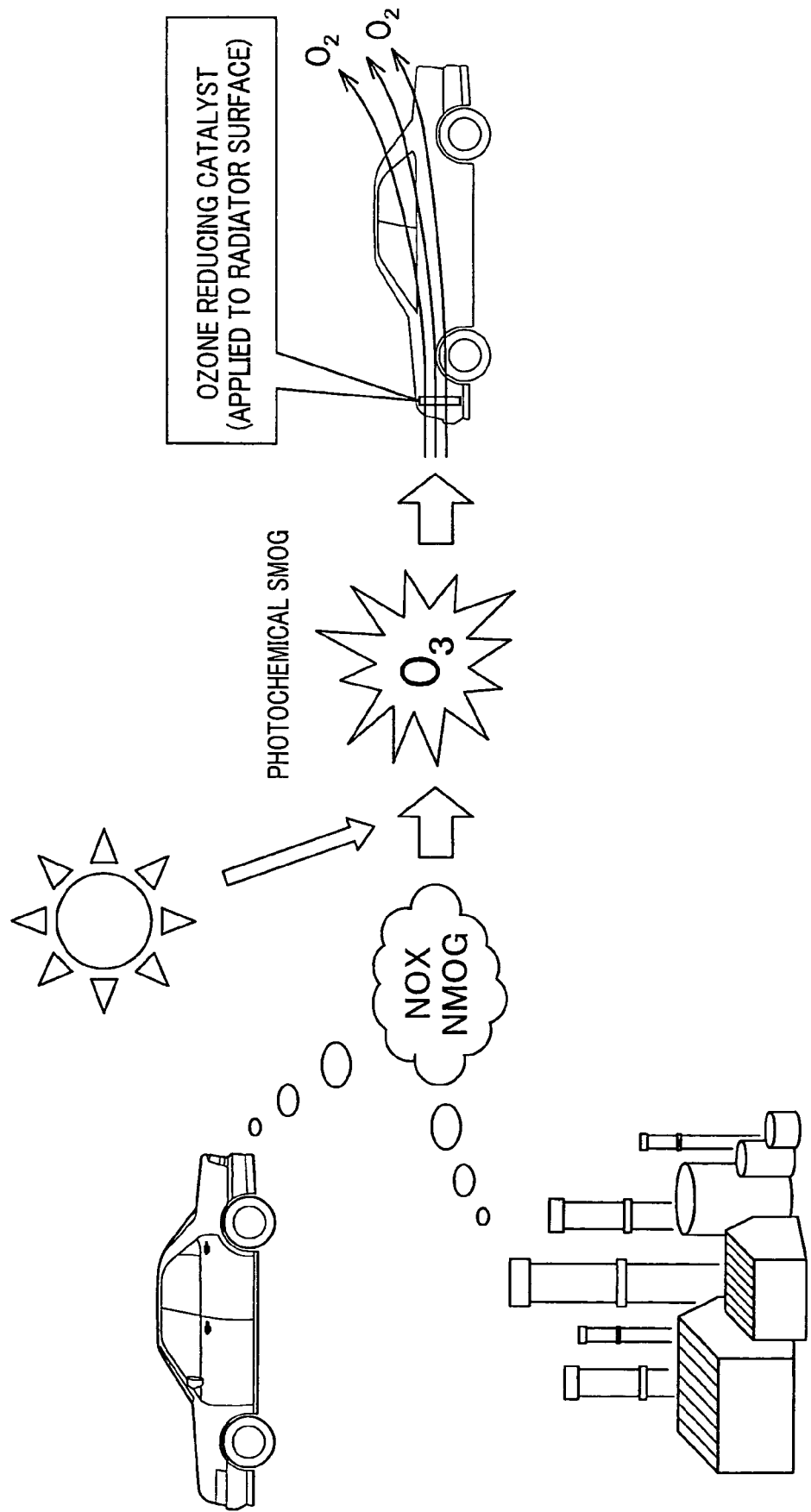
FIG. 9 is a schematic diagram showing a general smog-causing environment and a passenger car equipped with an ozone reduction device.

In these examples, as shown in FIGS. 7A and 7B, the catalyst coating remains at positions where the sensors 11, 12 are located, but has come off at positions where the sensors 13, 14 are located, as in the examples of FIGS. 6A and 6B. The airflow quantity is set at 610 m³ in the example of FIG. 7A, and at 590 m³ in the example of FIG. 7B.

In these examples, unlike the above examples of 6A and 6B, the peel sensors 11–14 are activated first, and then the airflow sensor is activated.

Turning to the example of FIG. 7A, the four peel sensors 11–14 are activated at the same time, and it is determined that the catalyst coating has come off at a position where the peel sensor 13 for 400–600 m³ of airflow is located and at a position where the peel sensor 14 for 300–400 m³ of airflow is located. Consequently, it is determined that the catalyst coating has deteriorated when the airflow quantity falls within a range between 300 m³ and 600 m³. However, the airflow sensor is activated after detection of peel sensors 11–14, and it is determined that the airflow quantity is 610 m³. Accordingly, in this instance, it is determined that the performance of the catalyst coating is maintained, and the MIL M remains turned off.

Similarly, in the example of FIG. 7B, the four peel sensors 11–14 are activated at the same time, and it is determined that the catalyst coating has come off at a position where the peel sensor 13 for 400–600 m³ of airflow is located and at a position where the peel sensor 14 for 300–400 m³ of airflow is located. The airflow sensor is activated after detection of peel sensors 11–14, and it is determined that the airflow quantity is 590 m³. Accordingly, in this instance, the MIL M is lit up to notify a passenger that the catalyst coating has deteriorated.

Third Embodiment

A description will be given of a third embodiment of the present invention with reference to FIGS. 8A and 8B, in which temperature distribution and position of attachment of the peel sensor on the front surface of the radiator are illustrated. As in the first embodiment, a distribution map of temperatures on the front surface of the radiator is delineated by plotting values actually measured in advance. Based on the distribution map of temperatures, the front surface of the radiator is divided into areas in which the peel sensor should be attached and areas in which the peel sensor should not be attached. In describing the present embodiment, components deemed identical with those in the first embodiment are designated by the same reference characters, and a duplicate description thereof will be omitted. It is to be understood that the temperature distribution represented as shown in FIG. 8A results from provision of two cooling fans at both sides of the radiator 2.

FIG. 8A shows a temperature distribution on the front surface of the radiator 2. The front surface of the radiator 2 is divided by three borders 21, 22 and 23 into four equal areas according to temperature: an area defined by two upper-limit borders of the low-temperature areas of which the percentages to the front surface area of the radiator 2 are 75% and 100%, respectively; an area defined by two upper-limit borders of the low-temperature areas of which the percentages to the front surface area of the radiator 2 are 50% and 75%, respectively; an area defined by two upper-limit borders of the low-temperature areas of which the percentages to the front surface area of the radiator 2 are 25% and 50%, respectively; and an area defined by two upper-limit borders of the low-temperature areas of which the percentages to the front surface area of the radiator 2 are 0% and 25%, respectively.

In the present embodiment, the same calculation as in the first embodiment is performed and it is determined that attaching a peel sensor to a position within an area between two upper-limit borders of the low-temperature areas covering 50% and 75% of the front surface area of the radiator 2 respectively makes it possible to accurately detect the loss and deterioration of the catalyst coating in an entire range of the possible airflow quantities (300–1200 m³). To be more specific, as shown in FIG. 8A, a single peel sensor is attached in the area defined between the borders 22 and 23 on the front surface of the radiator 2, so that the loss and deterioration of the catalyst coating can be accurately detected in the entire range of the possible airflow quantities (300–1200 m³).

Although the preferred embodiments of the present invention have been described above, various modifications and changes may be made in the present invention without departing from the spirit and scope thereof.

For example, the radiator 2 is used as an object to which a catalyst coating is applied in the above embodiments, but the present invention is not limited thereto, and the catalyst coating may be applied for example to any other heat exchanger such as an intercooler. In the above embodiments, the radiator 2 as a heat exchanger is a down-flow type radiator in which a coolant for the engine flows vertically. However, the present invention is not limited thereto, and a cross-flow type radiator in which a coolant for the engine flows horizontally, for example, may be used instead. In short, any radiator, of any shape, may be used as a heat exchanger, as long as the temperature characteristic thereof can be evaluated.

The temperature distribution of the front surface of the radiator 2 used in the above embodiments as temperature characteristic of the heat exchanger can be a time integral thereof obtained by time quadrature or integration over time during driving of the passenger car 1. The use of a time integral of the temperature distributions makes it possible to make the borders of temperature areas more definite, and to thereby determine the position of detection of the sensor with improved precision.

The peel sensor used in the above embodiments is constructed of an electric sensor for measuring the surface resistance of the radiator 2. However, usable sensing elements may include an optical sensor, a direct ozone amount sensing element (so-called ozone sensor) and the other sensing elements. When these alternative sensing elements are employed, the position of detection may not be equivalent with the position of attachment of the sensor. To be more specific, it is to be understood that the present invention is directed to determination of the position of detection, but not the position of attachment, of the sensor. The method of detection is also not restricted to specific types, but any methods may be applied as long as the presence or absence of the catalyst coating on a specific position can be detected adequately.

Moreover, the above embodiments are described with a passenger car taken by way of example of a vehicle in which the detector 6 is provided. However, the present invention is not limited thereto, and the detector 6 for a vehicle may be used in a truck, a motorcycle, or other types of vehicles.

In the above embodiments, an ozone reducing catalyst coating for decomposing ozone in atmosphere is described as a catalyst coating of the present invention. However, the present invention is applicable to a catalyst coating for decomposing any other chemical substances in the atmosphere, such as nitrogen oxides ($NO_x$), non-methane organic gases (NMOG), etc. which would directly cause air pollution.

The present invention can be exercised in any countries and regions regardless of whether or not the governments provide for the NMOG accreditation program as in California, United States.

What is claimed is:

1. A detector for a vehicle equipped with a heat exchanger, in which a catalyst coating provided in the heat exchanger decomposes a chemical substance in air passing through the heat exchanger, the detector comprising:
   a sensor that detects a remaining amount of the catalyst coating; and
   a control unit that generates an alarm based upon detection of the sensor, wherein a position of detection of the sensor is determined according to a temperature characteristic of the heat exchanger.

2. A detector according to claim 1, wherein the position of detection of the sensor is determined according to a flow rate of the air passing through the heat exchanger in addition to the temperature characteristic of the heat exchanger.

3. A detector according to claim 1, wherein the heat exchanger is a radiator, and a temperature distribution of a front surface of the radiator is used as the temperature characteristic of the heat exchanger.

4. A detector according to claim 1, wherein the heat exchanger is a radiator, and a time integral of temperature distributions of a front surface of the radiator is used as the temperature characteristic of the heat exchanger.

5. A detector according to claim 1, wherein the position of detection of the sensor is determined so that detection occurs when an amount of decomposition of the chemical substance by an action of the catalyst coating becomes less than a value declared in an application for certification of decomposing performance.

* * * * *